United States Patent [19]

Quinn

[11] Patent Number: 5,147,117
[45] Date of Patent: Sep. 15, 1992

[54] INTEGRATED ANTI-LOCK BRAKING AND TRACTION CONTROL SYSTEM

[75] Inventor: James F. Quinn, Troy, Mich.

[73] Assignee: General Motors Corporation, Detroit, Mich.

[21] Appl. No.: 671,570

[22] Filed: Mar. 19, 1991

[51] Int. Cl.$^5$ ............................................. B60T 8/58
[52] U.S. Cl. ........................ 303/115 EC; 303/113 TR
[58] Field of Search ................. 303/113 TR, 115 PP, 303/115 EC, 116 R, 116 SP, 115 FD, 115 VR, 113 R

[56] References Cited

U.S. PATENT DOCUMENTS

| 4,741,581 | 5/1988 | Krohn | 303/113 TR |
| 4,798,421 | 1/1989 | Bernhardt et al. | 303/113 TR |
| 4,846,534 | 6/1989 | Lieber et al. | 303/115 PP |
| 4,874,208 | 10/1989 | Siegel | 303/113 TR |
| 4,932,311 | 6/1990 | Mibu et al. | 303/115 EC |
| 4,957,331 | 9/1990 | Burton et al. | 303/115 EC |

FOREIGN PATENT DOCUMENTS 0008058  1/1988  Japan ........................... 303/115 EC Primary Examiner—Matthew C. Graham
Attorney, Agent, or Firm—Ernest E. Helms

[57] ABSTRACT

An integrated anti-lock braking (ABS)/traction control (TC) braking system for a vehicle is provided including in a preferred embodiment a controller cognizant of the rotational condition of a vehicle wheel for signalling the system to an ABS or TC mode. A master cylinder delivers pressurized fluid to the wheel brake. An actuator frame with a bore is fluidly connected with the master cylinder and the wheel brake generally along a first end. A first fluid network connects the master cylinder with the wheel brake. A reservoir fluidly connected with the bore and the brake for selective receipt of fluid from the bore. A second fluid network connects the reservoir and the ends of the bore with one another and fluidly connects the reservoir with the wheel brake. A check valve preventing flow from the master cylinder to the brake via the first fluid network. A valve responsive to the controller isolates the reservoir from the second fluid network when the integration is in the normal operation or the TC mode. A valve responsive to the controller which prevents fluid communication through the second fluid network when the integration is in an ABS mode. A valve responsive to the controller which prevents fluid communication between the master cylinder and the bore when the integration is in a TC mode. A piston is slidably mounted in the bore with a head separating the first and second ends of the bore.

4 Claims, 2 Drawing Sheets 5,147,117

INTEGRATED ANTI-LOCK BRAKING AND TRACTION CONTROL SYSTEM

FIELD OF THE INVENTION

The field of the present invention is that of an integrated anti-lock braking system (ABS) and traction control (TC) braking system for a vehicle and methods of utilization thereof.

DISCLOSURE STATEMENT

Anti-lock braking systems typically modulate the pressure delivered to a vehicle wheel brake to prevent the vehicle wheel from locking up in the braking condition. Conversely, traction control systems typically incorporate an automated braking system which actuates a brake to prevent spinning of the vehicle wheel, thereby maximizing the traction which can be exerted by that wheel. A more detailed analysis of anti-lock braking systems can be found in commonly assigned U.S. Pat. Nos. 4,756,391 and 4,653,815. A more detailed explanation of traction control systems which utilize actuation of a vehicle wheel brake for traction control can be found in commonly assigned U.S. Pat. application 223,327 filed Jul. 8, 1988 now U.S. Pat. No. 4,976,500.

The present invention provides an ABS/TC integration which is an alternative to that provided and described in coassigned U.S. Pat. Parker et al 4,938,543 and copending U.S. Pat. application Villec 438,174 filed Nov. 16, 1989 now U.S. Pat. No. 5,051,434.

SUMMARY OF THE INVENTION

The present invention provides an ABS and TC integration apparatus and method of utilization thereof which allows a common actuator mechanism to provide the ABS and TC functions.

It is an object of the present invention to provide an integrated ABS/TC braking system and method utilization thereof.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
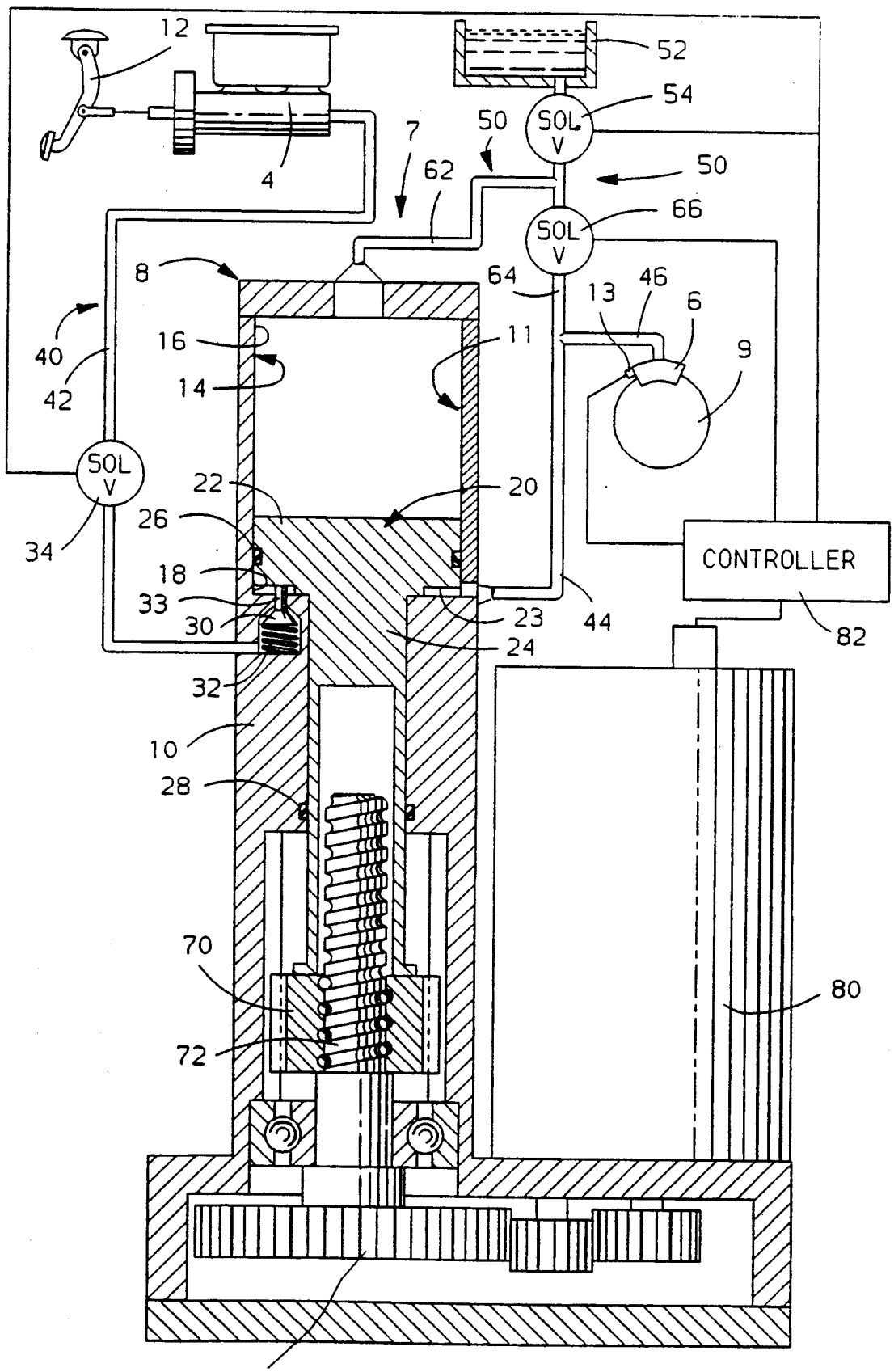
FIG. 1 is a sectional view with portions illustrated schematically of a preferred embodiment ABS/TC integrated braking system according to the present invention.

Referring to FIG. 1 an integrated anti-lock (ABS)/traction control (TC) braking system 7 has a master cylinder 4 for delivering pressurized fluid to a vehicle fluid actuated wheel brake 6 (commonly referred to as a brake cylinder for drum type brakes or as a caliper for disc type brakes). The master cylinder is linked with a pedal linkage 12 which is manipulated by a vehicle operator.

Between the master cylinder 4 and the wheel brake 6 is an actuator 8 with a frame 10. The actuator frame 10 has a multidiametered bore 11 that includes a large diameter actuator bore 14 with a first end 16 and a second end 18. Slidably and sealably mounted within the bore 14 of the actuator frame 10 is a piston 20 having a head section 22 and a connected rod 24. The piston head 22 sealably separates the first end 16 and second end 18 of the bore with an 0-ring type seal 26. The piston rod 24 is also sealed within the bore 11 by an 0-ring type seal 28.

The master cylinder 4 is fluidly connected with the second end 18 of the actuator bore 14 via a check valve 30. The check valve 30 is positioned in such a manner that pressure from the master cylinder 4 automatically closes the check valve 30 and as illustrated is biased by a spring 32. Between the check valve and the master cylinder 4 is a normally open solenoid valve 34 which provides the means of preventing fluid flow from the master cylinder 4 to the wheel brake 6 via a first fluid network 40 which includes a line 42 which runs from the master cylinder 4 to the check valve 30; the bottom of the enlarged diameter portion of the second end 18 of the actuator bore 14, and fluid lines 44 and 46 which fluidly connect the actuator bore 14 with the wheel brake 6.

The actuator bore first end 16 via a second fluid network 50 is fluidly connected with a reservoir 52 through a normally closed solenoid valve 54. The second fluid network 50, which is inclusive of lines 62, 64, 44 and 46 also connects the reservoir 52 with the wheel brake 6. The second fluid network 50 also provides a parallel path joining the first end 16 of the actuator bore 14 with the second end 18 of the actuator bore 14. The normally closed solenoid valve 54 provides for selective isolation of the reservoir 52 from the actuator bore 14 or the wheel brake 6. Also provided in the second fluid network 50 is a normally open solenoid valve 66 in a portion of the second fluid network 50 providing parallel connection of the first and second ends 16, 18 respectively of the actuator bore 14.

Alternatively (not shown) the reservoir 52 and the second fluid network 50 can fluidly connect the reservoir with the top of the actuator bore 14 via a solenoid valve. Fluid line 62 could then fluidly connect the bore 14 with a portion of the fluid line 64 before the solenoid valve 66 and opposite the connection of line 46.

The rod 24 of the piston 20 is operatively associated and contacting with a non-rotative nut 70 which is threadably engaged and penetrated by a drive screw 72 (commonly referred to as a ball screw). The drive screw 72 is gearably engaged with an electric motor 80, via gear train 84. The motor 80 is responsive to signals given by a system controller 82. The controller 82 is cognizant of the rotational condition of the wheel 9 via a sensor 13. When the wheel 9 is at a predetermined rotational condition the controller 82 will give a signal to place the braking system 7 into an ABS or a TC mode. The motor 80, solenoid valves 34, 66 and 54 are responsive to signals given by the controller and their operations will be governed by the controller 82.

When in normal operation the piston head 22 will be adjacent to the second end 18 of the actuator bore 14 and will contact a stem 33 of the check valve 30 thereby retaining the check valve 30 in an open position. Because of the area differential of the piston 20 at its sealed portions along seals 26 and 28, equal pressure on both sides of the piston head 22 will bias the piston 20 to the retracted position as shown in FIG. 1.

The underside of the head of the piston head 22 is grooved or chamfered, or there may be grooves within the portion of the actuator frame bore which interferes with the piston head 22 so that a fluid communication is provided from the master cylinder 4 through the normally open solenoid valve 34, pass the check valve 30 and out to the brake via the line 44. As illustrated, the piston head 22 has an annular groove 23 which provides for fluid communication.

In normal operation the check valve 30 will normally be held in a second open position versus a first closed position, and the valve 54 will be closed isolating the reservoir 52 from both the wheel brake 6 and the first end 16 of the actuator bore 14.

Referring to FIG. 1 if a skidding condition is sensed the controller 82 will signal the braking system 7 to an ABS relief cycle. The solenoid valve 34 will remain in a normally open condition. Solenoid valve 66 will be signalled to a closed position and the normally closed solenoid valve 54 connecting the first end 16 of the actuator bore 14 with the reservoir 52 will then be opened. The motor 80 will be signalled to power a gear train 84 and drive screw 72 to extend the piston 20 within the actuator bore 14. Any fluid on top of the piston head will be pushed into the reservoir 52. Since the wheel brake 6 is now exposed to the volume underneath the piston head 22, extension of the piston 20 upward will cause an increase in the volume that the fluid within the wheel brake 6 is exposed to therefore causing the pressure within the wheel brake 6 to be reduced.

On a pressure reapply the motor 80 will be signalled to reverse forcing the piston 20 downward to a pressure reapply. If by chance there is a need for pressure augmentation (due to the ABS mode being initially actuated when the wheel 9 is on ice and thereafter the wheel 9 is now on firmer pavement allowing greater brake pressure to be applied) the piston head 22 will come down fully hitting the stem 33 of the check valve 30 therefore allowing additional fluid from the master cylinder 4 to be delivered to the wheel brake 9. One advantage of the present invention is that pressure augmentation occurs automatically and mechanically without the requirement of electrical signalling or an input from a controller or pressure sensor which senses the need for such a response.

If the controller 82 is aware that TC situation has occurred, the solenoid valve 34 will be signalled to the closed position isolating the master 4 cylinder from the wheel brake 6. Solenoid valve 54 will be maintained in the closed position isolating the reservoir 52 from either the first end 16 of the actuator bore 14 or the wheel brake 6. The solenoid valve 66 will be in the normal open position. Therefore extension of the piston upward (by the motor 80) will cause an increase pressure in a wheel brake 6 since the fluid will be forced away from the first end 16 of the actuator bore 14 into the second end 18 (via the second fluid path) of the actuator bore 14 and the wheel brake 6. The piston rod 24 provides volumetric differential between the first 18 and second 16 ends of the actuator bore 11. Thereby extension of the piston upward causes increased pressure in the fluid exposed to the wheel brake 6. On a pressure release cycle of TC the motor 80 will be signalled to reverse (retract) the piston allowing the volume of the system exposed to the wheel brake 6 to be increased and therefore reduce the pressure.

Figure 2:
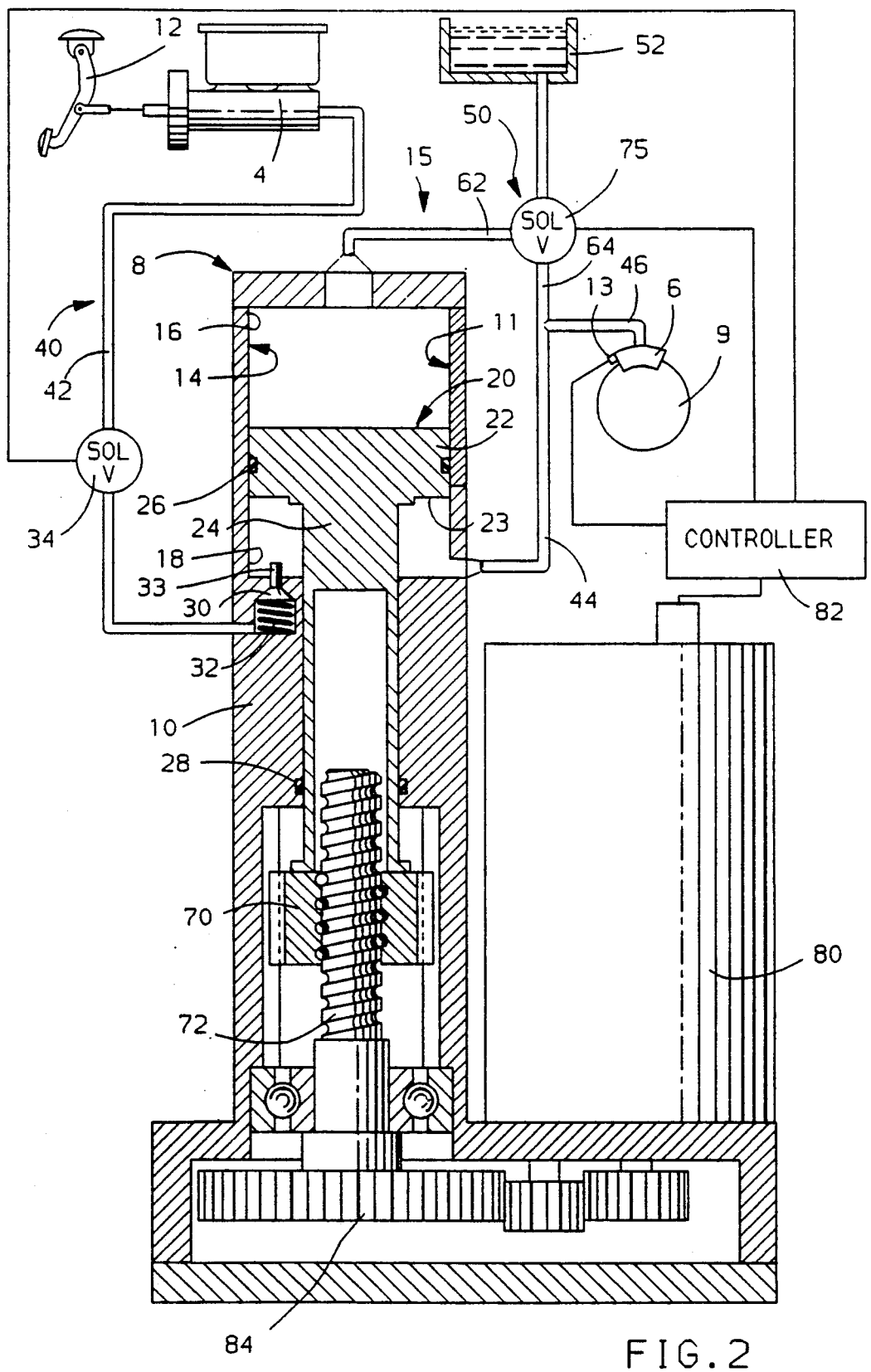
FIG. 2 is a view similar to FIG. 1 of an alternative preferred embodiment of the present invention.

FIG. 2 shows an alternative preferred embodiment of the present invention with item performing similar function being given the same reference number wherein the functions of the prior solenoid valves 54 and 66 solenoid valves have been combined into a single three-way solenoid valve 75 which in the normal braking condition isolates the reservoir 52 from either the first end 16 of the actuator bore 14 or the wheel brake 6. The first end 16 and second end 18 of the bore are fluidly connected. In the ABS mode solenoid valve 75 isolates the reservoir 52 from the wheel brake 6 while exposing the reservoir to the first end 16 of the bore 14. In the TC mode, the solenoid valve 75 functions the same as during the normal braking operation.

Several advantages that both embodiments of the present invention provide are a high TC pressure versus the size of the motor ratio, a relatively short piston stroke and actuator frame length. Also there is no requirement for a neutral position sensor to determine the position of the piston or for a motor locking device which will prevent backdriving of the piston during normal brake application. Additionally, there are very few dynamic seals.

While a few of the embodiments of the present invention have been explained it will be really apparent to those skilled in the art of the various modifications which can be made to the present invention without departing from the spirit and scope of this application as it is encompassed by the following claims.

What is claimed:

1. A braking system for a vehicle having anti-lock braking capabilities and traction control braking capabilities for a vehicle having a fluid actuated brake for a wheel comprising:
   a system controller aware of the rotational condition of the wheel for signaling the system to an anti-lock braking mode and to a traction control mode from a normal mode of operation and from another mode of operation differing from the signaled mode of operation;
   master cylinder means for delivering pressurized fluid to the wheel brake;
   an actuator frame with a bore having two ends, the bore being fluidly connected with the master cylinder means and the wheel brake generally along the first end;
   a first fluid network fluidly connecting the master cylinder means with the wheel brake;
   a reservoir fluidly connected with the bore and the brake for selective receipt of fluid from the bore;
   a second fluid network fluidly connecting the reservoir and the two ends of the bore with one another and fluidly connecting the reservoir with the wheel brake;
   check valve means having a first position preventing flow from the master cylinder to the brake via the first fluid network and the check valve means having a second position allowing flow from the master cylinder to the brake via the first fluid network;
   means responsive to the controller for isolating the reservoir from the second fluid network when the braking system is in the normal mode of operation and when the braking system integration is in traction control mode of operation;
   means responsive to the controller for preventing fluid communication through the second fluid network between the two ends of the bore when the integration is in an anti-lock braking mode;
   means responsive to the controller for preventing fluid communication between the master cylinder in the bore when the integration is in a traction control mode;

a piston slidably mounted in the bore with a head sealably separating the first and second ends of the bore, the piston having a connected rod sealed with respect to the bore;

mechanical means for retaining the check valve means to an open position when the piston head is adjacent to the first end of the bore during normal operation;

and means to reversibly move the piston in response to the controller causing the piston to open the check valve in normal operation.

2. A braking system as described in claim 1 wherein said means to reversibly move the piston includes an electric motor gearably engaged with a rotative drive screw having a non-rotative nut contacting with the rod of the piston.

3. A braking system as described in claim 1 wherein the means for isolating the reservoir from the second fluid network and for preventing fluid communication through the second network are embodied in a three-way valve.

4. A braking system for a vehicle having anti-lock braking capabilities and traction control braking capabilities for a vehicle having a fluid actuated brake for a wheel comprising:

a system controller aware of the condition of the wheel for signaling the system to the anti-lock braking and the traction control mode from the regular mode and from a prior mode differing from the signaled mode;

a master cylinder for delivering pressurized fluid to the wheel brake;

an actuator frame with a bore being fluidly connected with the master cylinder along one end of the bore and with the wheel brake at generally the same end of the bore;

a first fluid network fluidly connecting the master cylinder with the wheel brake;

a reservoir fluidly connected with the bore for selective receipt of fluid from the bore at an end of the bore opposite with the bore's connection with the master cylinder;

a second fluid network fluidly connecting the reservoir and the two ends of the bore, and the second fluid path also connecting the reservoir with the wheel brake;

a check valve having a first position preventing flow from the master cylinder to the wheel brake via the first fluid network and a second position allowing flow;

a three-way valve responsive to the controller, the valve in the normal mode isolating the reservoir from the wheel brake and the bore and connecting the second end of the bore with the wheel brake during normal operation, the valve having a second mode of operating during the anti-lock braking mode wherein it connects the second end of the bore with the reservoir and isolates the reservoir from the wheel brake and wherein a third mode of operation the valve connects the second end of the actuator bore with the wheel brake while isolating the reservoir from the bore or the wheel brake;

a solenoid valve responsive to the controller for preventing fluid communication between the master cylinder and the first end of the bore when the integration is in a traction control mode;

a piston slidably mounted within the bore with a head sealably separating the first and second ends of the bore the piston also having a connected rod sealed within the bore and the piston head being operatively associated with the check valve wherein the check valve is held in the second position when the piston is adjacent the first end of the bore allowing for normal operation wherein fluid from the master cylinder flows through the check valve and to the wheel brake via the cylinder;

a non-rotative nut operatively associated with the piston rod;

a drive screw threadably engaged with the nut and the drive screw being gearably connected with a reversible motor responsive to signals by the controller to move the piston reversibly in response to the controller.

* * * * *